Patented Oct. 5, 1943

2,330,804

UNITED STATES PATENT OFFICE 2,330,804

DEHYDROGENATION OF ALIPHATIC HYDROCARBONS

Robert G. Atkinson, Sunray, Tex., assignor to The Shamrock Oil and Gas Corporation, Amarillo, Tex., a corporation of Delaware No Drawing. Application April 9, 1940, Serial No. 328,729

10 Claims. (Cl. 260—683)

The present invention relates to an improved process of catalytically dehydrogenating aliphatic hydrocarbons so as to convert them into unsaturated hydrocarbons, most of which have the same number of carbon atoms as the hydrocarbon molecules which have been dehydrogenated.

One of the primary objects of the invention is to dehydrogenate aliphatic hydrocarbons, particularly those having a comparatively small number of carbon atoms, as for example butane, for the purpose of converting the same into the corresponding olefins, for example butylene, and to accomplish this with the production of the least amount of undesired by-products.

It has already been proposed in the past to dehydrogenate aliphatic hydrocarbons, but this has usually been accomplished only with the aid of certain catalysts which have a short period of active life, necessitating reactivation after being in use for a short time, for example thirty minutes. In accordance with the present invention, the dehydrogenation is effected by means of a special catalyst comprising phosphomolybdic acid, which may remain active for a period of twenty-four hours or longer, a particular feature of the invention also lying in the carrying out thereof in the substantially complete absence of any moisture or water in vapor form.

Broadly speaking, the present invention comprises passing a gaseous or vaporous hydrocarbon through a conversion chamber or tube containing phosphomolybdic acid distributed upon a suitable carrier, heating the gas while passing over the catalyst to a temperature somewhere between 1100° and 1200° F., at which temperature and under which conditions the reaction proceeds rapidly enough so that the hydrocarbon gas or vapor may be processed at a space velocity per hour of about 500 to 700, yielding a conversion so great that there will be about 10% of the corresponding unsaturated hydrocarbon or hydrocarbons in the exit gases from the reaction chamber.

To prepare the catalyst found to be most desirable for carrying out the present invention, the following procedure may be used to advantage: A solution of phosphomolybdic acid in water is prepared, the concentration of this solution varying between, for example, 10% and 20% of actual solids. Into this solution there is poured or otherwise placed a mass of granules of activated alumina varying in size between ⅛ and ¼ inch, whereupon the solution is evaporated in contact with the granules until the water has been evaporated. The proportion of granules to the total amount of phosphomolybdic acid contained in the solution is preferably so chosen that there will be obtained alumina granules coated with phosphomolybdic acid in the proportion of approximately 80% by weight of $Al_2O_3$ and 20% by weight of phosphomolybdic acid. The granules are dried at a temperature of 212° to 230° F. and are then preferably placed in a vacuum wherein they are heated to a temperature of about 800° to 1000° F. for the purpose of withdrawing from the coated alumina granules all the water of crystallization or other moisture which may still be contained on the granules of the catalyst.

The catalyst thus obtained is then placed in the catalytic chamber, which may consist of, for example, a horizontally or vertically disposed tube, say from 3 to 5 inches in diameter and of any desired length—let us say 20 feet. Means are also provided for heating the tube or tubes so that they may acquire a temperature of from 1100° to 1200° F. Preferably, before actually applying the catalyst to the dehydrogenation of the gaseous saturated aliphatic hydrocarbons, hydrogen is passed over the catalyst at a temperature of 800° to 1100° F. for the purpose of enhancing its activity. It has been found, however, that it is not absolutely necessary to do this, as the passing of the hydrocarbons over the catalyst at the stated temperature will soon effect a somewhat similar change therein as is produced by the hydrogen, with the result that its activity soon rises to the maximum. When passing, for example, a saturated aliphatic hydrocarbon such as butane, $C_4H_{10}$, through such a catalyst at a space velocity of from 500 to 700, in the temperature range indicated above, it will be found that it becomes converted to the extent of about 10% into unsaturated hydrocarbons, particularly butylenes. The hydrocarbon conversion mixture issuing from the catalytic chamber may then be employed for whatever purposes it may be suited, which purposes are outside the scope of the present invention. It may be mentioned however that such a mixture may be cooled and then fractionated in order to remove therefrom any hydrogen or lower boiling hydrocarbons than the butane and butylene, and it is also possible to effect a removal of the unsaturated olefinic hydrocarbons such as the butylene from the unchanged butane by polymerization of the unsaturated and separation by fractionation. As a further alternative, the butylene—either in admixture with the effluent gases or otherwise—may be subjected to alkylation reactions well known in the petroleum art for the purpose of producing a mixture containing a large percentage of iso-octane, from which mixture the removal of the unchanged butane and other therein present lighter hydrocarbons may be effected by fractionation. It is also within the scope of the present invention to return to the catalytic dehydrogenation chamber such unchanged saturated hydrocarbons as, for example, the butane for the purpose of dehydrogenating them further. By taking advantage of such methods of recycling, the conversion of as much as 87% of the butane to butylene may be accomplished.

As already indicated, it has been found that the selectivity of the catalyst is considerably enhanced by assuring the complete absence of all moisture from the gases and vapors entering the catalytic dehydrogenating chamber. Such dehydration may, for example, be accomplished by passing the gases and/or vapors through a mass of a dehydrating agent such as calcium chloride, phosphorous pentoxide, or dry activated alumina. It appears that the dehydrogenation of the aliphatic hydrocarbons, such as butane, is most selectively and effectively accomplished if no moisture or water of any kind is present with the catalyst.

The exact method of heating the hydrocarbon gases which are to be dehydrogenated is not important provided only that the gases acquire a temperature of between 1100° and 1200° F. while in contact with the catalyst. Thus, the gases may be preheated to a temperature of, let us say, 800° or 900° F., which is low enough to prevent excessive preliminary thermal reaction, before they enter the dehydrogenation chamber, wherein sufficient additional heat is applied to bring them to the dehydrogenating temperature, sufficient additional heat also being supplied to make up for the loss of heat caused by the endothermic nature of the dehydrogenating reaction. The gases issuing from the catalytic chamber should be cooled down promptly, and this obviously can be very advantageously accomplished by indirect heat exchange with the fresh gases which are on their way to the catalytic chamber. Methods of accomplishing these objects and means for so doing are thoroughly well known and understood in the art to which the present invention pertains and therefore will require no specific illustration.

Preferably, the dehydrogenation is carried out at a comparatively low pressure. Pressures suitable for that purpose have been found to be between 20 pounds per square inch gauge, or even less, and up to about 300 pounds per square inch gauge. The only advantage of the high pressures within this range lies in the fact that the apparatus can be made correspondingly smaller.

The reactions involved in the present invention may be illustrated by the following formula: $C_4H_{10} \rightarrow C_4H_8 + H_2$. In the case of other saturated hydrocarbons, the reaction is entirely analogous.

The invention is equally available for the conversion of isobutane into isobutylene or normal butane into butylene and, of course, is not to be limited to the dehydrogenation of butanes. Propane will, of course, be converted into propylene, while the conversion of pentanes into pentenes, hexanes into hexylenes, etc., is of course within the purview of the invention.

In order to demonstrate the decided advantage of operating with a completely dried gas, the results of some experiments will now be given but with the distinct understanding that they are not to be interpreted as in any way limiting the scope of the present invention. In the subjoined table, the results of these experiments, the analysis of the gases charged to the dehydrogenating chamber and of the gases removed are given in mol per cent.

ANALYSIS OF CHARGE, MOL %

| Propane | Isobutane | N-butane | Isobutylene | Butylene |
|---|---|---|---|---|
| 1.22 | 19.51 | 77.97 | .60 | .70 |

EXPERIMENT NO. 1

CHARGE DRIED WITH CALCIUM CHLORIDE

*Experimental data*

| Temperature of dehydrogenation | Pressure #/in.² gauge | Approximate time on stream | Space velocity per hour |
|---|---|---|---|
| °F. 1,100 | 0.3 | Hours 1 | 720 |

ANALYSIS OF EXIT GAS, MOL %

| Hydrogen | Methane | Ethane | Propylene | Propane | Iso-butane |
|---|---|---|---|---|---|
| 8.70 | .25 | 1.02 | .27 | .81 | 14.01 |

| N-butane | Isobutylene | Butylene |
|---|---|---|
| 68.46 | 2.80 | 3.68 |

APPROXIMATE MOLS OF PRODUCT PER 100 MOLS $C_4H_{10}$ DECOMPOSED

| Hydrogen | Methane | Ethane | Isobutylene | Butylene |
|---|---|---|---|---|
| 144.88 | 4.16 | 16.99 | 37.47 | 50.63 |

The propylene in the exit gas analysis can be accounted for on the assumption that it was produced by dehydrogenation of the small amount of propane present in the charging stock.

EXPERIMENT NO. 2

CHARGE NOT DRIED WITH CALCIUM CHLORIDE

*Experimental data*

| Temperature of dehydrogenation | Pressure #/in.² gauge | Approximate time on stream | Space velocity per hour |
|---|---|---|---|
| °F. 1,100 | 0.3 | Minutes 40 | 600 |

ANALYSIS OF EXIT GAS, MOL %

| Hydrogen | Methane | Ethylene | Ethane | Propylene | Propane |
|---|---|---|---|---|---|
| 15.80 | 5.55 | 1.63 | 3.31 | 3.24 | 2.13 |

| Isobutane | N-butane | Isobutylene | Butylene |
|---|---|---|---|
| 5.48 | 54.38 | 4.75 | 3.73 |

APPROXIMATE MOLS OF PRODUCT PER 100 MOLS C₄H₁₀ DECOMPOSED

| Hydrogen | Methane | Ethylene | Ethane | Propylene | Propane |
|---|---|---|---|---|---|
| 104.94 | 36.86 | 10.83 | 21.98 | 21.52 | 7.97 |

| Isobutylene | Butylene |
|---|---|
| 28.43 | 21.25 |

EXPERIMENT NO. 3

DEHYDROGENATION OF MIXED BUTANES AT 300 POUNDS PER SQUARE INCH PRESSURE

[A mixture of iso and normal butane was passed through flake calcium chloride before entering the furnace tube containing the catalyst]

*Experimental data*

| Temperature of dehydrogenation | Pressure #/in.² gauge | Approximate time on stream | Space velocity per hour |
|---|---|---|---|
| °F. 1,100 | 300 | Hours 1 | 600 |

ANALYSIS OF PRODUCTS EXIT GAS, MOL %

| Hydrogen | Ethylene | Isobutylene | Butylene and propylene |
|---|---|---|---|
| 7.7 | 1.0 | 12.2 | 5.7 |

Referring to Experiment No. 1, in which the original charge contained a total of 97.48% of butanes, of which 19.51% was isobutane and 77.97% was the normal butane, using a dehydrogenation temperature of 1100° F., a pressure of 0.3 pound per square inch gauge, and a space velocity based on the catalyst volume of 720, about 6.62% of the gas was converted. The analysis of the dehydrogenated gas, it will be noticed, shows the presence therein of hydrogen, methane, ethane, propylene, propane, isobutane, normal butane, isobutylene and butylene, in the mol percentages shown in the table. The mols of product per 100 mols of butane decomposed are also shown, being in the case of the dried gases equal to 88.10 mols of mixed butylenes produced, of which 37.47 were the iso variety.

In the case of Experiment No. 2, and with the same charging stock, the total mols of butylenes produced per 100 mols of butane decomposed was 49.68, of which 28.43 were the iso variety.

This therefore demonstrates that the selectivity of the catalyst—that is to say, its specificity to the conversion of butane into butylene—is much greater when moisture is absent than when moisture is present.

The catalyst can be operated for a period of from 25 to 30 hours before serious loss in activity results, this loss being due primarily to the deposition of carbon upon the catalyst. When this occurs, the gases can be switched to a second, reserve, catalytic chamber while the catalyst in the first chamber is reactivated by the expedient of burning the carbon therefrom by passing air through the apparatus, using certain precautions, of course, to prevent mixture of air with hydrocarbons in explosive proportions.

The catalyst has been found to be quite durable and will require practically no other treatment than that of burning the carbon from it whenever it has become sufficiently coated to impair its activity to the point where such removal of carbon becomes advisable.

In the above described process phosphomolybdic acid is stated to serve as the catalyst. However, during the process, at least a partial reduction of the compound probably occurs to form a compound which may be reoxidized when the carbon is burned from the catalyst as above described. It is probable that the reduced compounds and the reoxidized compounds also function as catalysts in the process, and it is intended to include them within the scope of my invention. By the term "a phosphomolybdic acid" as used in the appended claims, it is intended to mean not only the original phosphomolybdic acid catalyst but also the reduction product which may be formed during the use of the catalyst in the process or the product which may result from the alternate reduction and oxidation after use and regeneration.

What is claimed as new is:

1. The process of dehydrogenating aliphatic hydrocarbons which comprises passing the same at a temperature between 1100° F. and 1200° F. over a catalyst comprising phosphomolybdic acid.

2. The process of dehydrogenating aliphatic hydrocarbons which comprises passing the same at a temperature between 1100° F. and 1200° F. over a catalyst comprising phosphomolybdic acid distributed on aluminium oxide.

3. The process of dehydrogenating aliphatic hydrocarbons which comprises passing them in substantially completely anhydrous condition over a phosphomolybdic acid catalyst at an elevated temperature.

4. The process of dehydrogenating aliphatic hydrocarbons which comprises passing them in substantially completely anhydrous condition over a phosphomolybdic acid catalyst at a temperature above 1000° F.

5. The process of dehydrogenating aliphatic hydrocarbons which comprises passing them in substantially completely anhydrous condition over a phosphomolybdic acid catalyst at a temperature between 1100° F. and 1200° F.

6. The process of dehydrogenating aliphatic hydrocarbons which comprises the steps of passing them over a powerful dehydrating agent to remove all traces of moisture therefrom and then passing them at a temperature of between 1100° F. and 1200° F. over a phosphomolybdic acid catalyst.

7. The process of converting butanes into butylenes which comprises passing butane at a temperature between 1100° F. and 1200° F. over a catalyst comprising phosphomolybdic acid.

8. The process of dehydrogenating aliphatic hydrocarbons which comprises passing the same at a temperature above 1000° F. over a catalyst comprising a phosphomolybdic acid.

9. The process of dehydrogenating aliphatic hydrocarbons which comprises passing the same at a temperature above 1000° F. over a catalyst comprising phosphomolybdic acid.

10. The process of dehydrogenating aliphatic hydrocarbons which comprises passing the same at a temperature above 1000° F. over a catalyst comprising a phosphomolybdic acid deposited on aluminum oxide.

ROBERT G. ATKINSON.